(No Model.)
G. D. SMITH.
WAGON WHEEL TIRE.
No. 269,128. Patented Dec. 12, 1882.
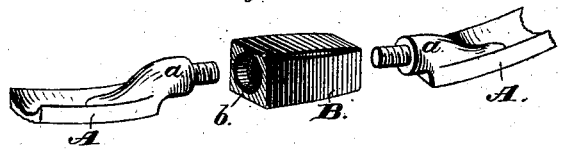
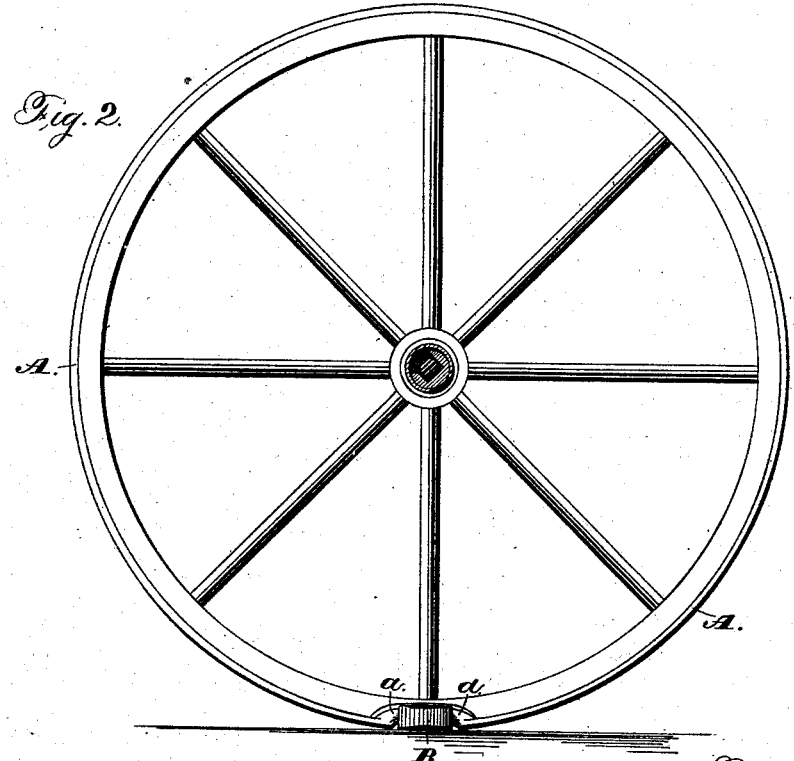
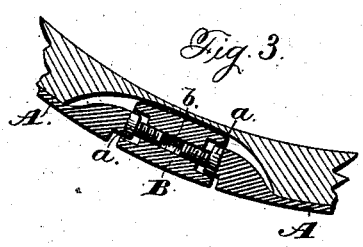
Witnesses.
Jas. E. Hutchinson
Henry C. Hazard.
Inventor.
Geo. D. Smith, by
Geo. S. Prindle, his Atty

UNITED STATES PATENT OFFICE.

GEORGE D. SMITH, OF GLENN SPRINGS, SOUTH CAROLINA, ASSIGNOR TO HIMSELF AND J. HAMILTON HUNT, OF NEW YORK, N. Y.

WAGON-WHEEL TIRE.

SPECIFICATION forming part of Letters Patent No. 269,128, dated December 12, 1882.

Application filed April 22, 1882. (No model.)

*To all whom it may concern:*

Be it known that I, GEO. D. SMITH, of Glenn Springs, in the county of Spartanburg, and in the State of South Carolina, have invented certain new and useful Improvements in Tires for Wagon-Wheels; and I do hereby declare that the following is a full, clear, and exact description thereof, reference being had to the accompanying drawings, making a part of this specification, in which—

Figure 1 is a perspective view of my device as applied to a tire, the parts being separated from each other. Fig. 2 is a side elevation of a wheel having its tire secured in place by means of said device. Fig. 3 is a central longitudinal section of said device and its adjacent parts when in position upon a wheel, and Fig. 4 is a cross-section of the tire preferably used.

Letters of like name and kind refer to like parts in each of the figures.

The design of my invention is to enable the tires of wagon-wheels to be easily and quickly secured in or removed from position and to be tightened whenever required; to which end it consists, principally, in a divided wagon-tire provided upon its ends with screw-threads, in combination with a section adapted to engage with and draw said ends together, substantially as and for the purpose hereinafter specified.

It consists, further, in the construction and combination of parts, substantially as and for the purpose hereinafter shown.

In the annexed drawings, A represents a metal wagon-tire, which has preferably a concave form in cross-section of its inner side, and is divided transversely at one point of its circumference. Each end of the tire A is provided with a lug, $a$, which, while in line with said tire, is offset inward, as seen in Figs. 1 and 3. The inner end of each lug is cylindrical, and has preferably a diameter equal to about two-thirds the width of said tire, while its outer portion has a considerably less diameter, and is threaded, the thread upon said lugs having relatively opposite directions.

Fitted over and engaging with the lugs $a$ is a section, B, which is square, with rounded corners, and is provided with an axial opening, $b$, that at each end corresponds to and fits over the cylindrical and threaded portions of each lug. The central portion of said opening is threaded to correspond to the threads of said lugs, so that if said section is placed in position and rotated in one direction it will engage with and draw toward each other said lugs, while by rotating said section in an opposite direction said lugs will be moved apart. The diameter of the intermediate section, B, is such that when turned until its faces occupy the same planes as the edges and periphery of the tire A said faces will be flush with and complete the lines of the same.

The tire A, thus constructed, is placed around a wheel, C, which has its periphery adapted to receive the same, and at one point is recessed to receive the lugs $a$ and section B, after which, by the rotation of said section, the ends of said tire are drawn together, and it is caused to embrace said wheel as closely as may be desired. This construction enables a tire to be placed in or removed from position with ease and in a fraction of the time usually required, and permits said tire to be tightened or loosened, as occasion requires, with little trouble, at any time, and without the removal of said tire.

In consequence of the concave interior of the tire A, no bolts are required to keep it in lateral position upon the wheel C, it being impossible that displacement should take place while the tire is intact and the section B in place.

Having thus fully set forth the nature and merits of my invention, what I claim as new is—

1. A divided wagon-tire provided upon its ends with screw-threads, in combination with a section interposed between said ends and adapted to engage with and draw the same together and to complete the bearing-surface or periphery of said tire, substantially as and for the purpose specified.

2. In combination with the divided tire provided with the offset threaded lugs $a$, the intermediate bearing-section, B, having an axial opening, $b$, which is fitted to and adapted to screw over said lugs, substantially as and for the purpose shown.

In testimony that I claim the foregoing I have hereto set my hand this 20th day of March, 1882.

G. D. SMITH.

Witnesses:
W. B. MONTGOMERY,
GEO. W. NICHOLLS.